United States Patent [19]

Dolivo et al.

[11] Patent Number: 4,644,564
[45] Date of Patent: Feb. 17, 1987

[54] DECODING THE OUTPUT SIGNAL OF A PARTIAL-RESPONSE CLASS-IV COMMUNICATION OR RECORDING DEVICE CHANNEL

[75] Inventors: Francois B. Dolivo, Wädenswil; Gottfried Ungerboeck, Langnau, both of Switzerland; Thomas D. Howell, San Jose, Calif.

[73] Assignee: International Business Machines Corporation, Armonk, N.Y.

[21] Appl. No.: 787,277

[22] Filed: Oct. 15, 1985

Related U.S. Application Data

[63] Continuation-in-part of Ser. No. 520,666, Aug. 5, 1983, Pat. No. 4,571,734.

[51] Int. Cl.$^4$ .............................................. H04L 3/00
[52] U.S. Cl. ..................................... 375/18; 375/102; 340/347 DD
[58] Field of Search ...................... 375/17, 18, 19, 20, 375/34, 39, 102, 42, 67; 370/48, 56; 340/347 DD; 371/60, 62, 64; 328/162

[56] References Cited

U.S. PATENT DOCUMENTS

| | | | |
|---|---|---|---|
| Re. 30,182 | 12/1979 | Howson | 375/18 |
| 3,508,153 | 4/1970 | Gerrish et al. | 375/18 |
| 3,792,356 | 2/1974 | Kobayashi et al. | 375/18 |
| 4,077,021 | 2/1978 | Csajka et al. | 375/67 |
| 4,123,710 | 10/1978 | Stuart et al. | 375/18 |
| 4,447,908 | 5/1984 | Chevillat et al. | 375/42 |
| 4,472,813 | 9/1984 | Koike et al. | 375/18 |
| 4,483,012 | 11/1984 | Wei | 375/39 |

Primary Examiner—Robert L. Griffin
Assistant Examiner—Stephen Chin
Attorney, Agent, or Firm—R. Bruce Brodie

[57] ABSTRACT

A maximum-likelihood sequence decoder is used with a partial-response signaling system for processing sequences of sampled values from a communication channel or recording device. The partial-response signals can be duobinary, dicode, or partial-response class-IV. The maximum-likelihood decoding for each sequence can be based upon a two-state trellis. Instead of two survivor metrics for two states, only a difference metric is necessary.

3 Claims, 9 Drawing Figures

DECODING THE OUTPUT SIGNAL OF A PARTIAL-RESPONSE CLASS-IV COMMUNICATION OR RECORDING DEVICE CHANNEL

COPENDING APPLICATIONS

This application is a continuation-in-part of copending application Ser. No. 06/520,666, filed on Aug. 5, 1983, now U.S. Pat. No. 4,571,734 in the name of F. B. Dolivo, G. Ungerboeck, and T. D. Howell.

TECHNICAL FIELD

This invention relates to the decoding of a binary symbol sequence ($a_n$) which appears at the output of a channel in modified form. In particular, the invention is concerned with maximum-likelihood sequence estimation (MLSE) decoding of such a sequence which is received from a communication channel or recording device whose intersymbol interference is of a partial-response class described by one of three polynomials $1+d$, $1-d$, or $1-d^2$. Major application areas are PCM transmission and magnetic recording.

BACKGROUND OF THE INVENTION

Partial-response signaling allows a better handling of intersymbol interference and allows a more efficient utilization of the bandwidth of a given channel. In partial-response (PR) systems, a controlled amount of intersymbol interference can be allowed. As the intersymbol interference then is known, the receiver can take it into account. PR signaling in communications allows transmissions at the Nyquist rate, and provides an attractive trade-off between error probability and the available spectrum. The partial-response systems described by the polynomials $1+d$, $1-d$, and $1-d^2$ are also called duobinary, dicode, and class-IV, respectively.

Maximum-likelihood sequence estimation, in particular the Viterbi algorithm, is an effective tool in receivers for improving the detection of symbol sequences in the presence of intersymbol interference. It as described in the articles by G. D. Forney, "The Viterbi Algorithm", Proceedings of the IEEE, Vol. 61, No. 3, March 1973, pp. 268-278, and by G. Ungerboeck, "Adaptive Maximum-likelihood Receiver for Carrier-modulated Data Transmission Systems", IEEE Transactions on Communications, Vol. COM-22, No. 5, May 1974, pp. 624-636. These articles also show some basic form of MLSE receivers or portions thereof.

The utilization of MLSE or Viterbi algorithm in connection with partial-response signaling systems was already suggested for both above-mentioned application areas by a publication of H. Kobayashi, "Application of Probabilistic Decoding to Digital Magnetic Recording Systems", IBM Journal of Research and Development, Vol. 15, No. 1, January 1971, pp. 64-74.

The problem of maximum-likelihood sequence estimation can be stated as follows. Given a received sequence ($z_n$), where n is an integer time index, choose from among all possible transmitted sequences ($x_n$) the one which is most likely to cause ($z_n$) to be received, i.e. choose ($x_n$) to maximize $p((z_n)|(x_n))$. The symbols of ($x_n$) are not detected independently of one another, rather they are detected "in context". Maximum-likelihood sequence estimation can be done efficiently using the Viterbi algorithm, a form of dynamic programming. The Viterbi algorithm maintains a set of "survivor" sequences and a metric for each indicating the likelihood of that sequence. One property of these metrics is that their absolute values can grow without bound.

THE INVENTION

It is an object of the present invention to devise a method and apparatus for reliably decoding a signal representing a sequence of time-discrete binary symbols received from a transmission channel or read in a recording device, which allow to reduce the necessary circuitry to a minimum and enable operation at high speed. It is a further object to generate tentative decisions with a minimum delay with respect to the time at which the signal representing the symbol is presented to the receiver.

It is assumed that the channel synchronously transmits or records a sequence of binary symbols $a_n = +1$ or $a_n = -1$, with n being an integer symbol time index. The output signal is filtered and sampled so as to obtain values ($y_n$) with intersymbol interference of a partial-response clase described by one of the three polynomials $1+d$, $1-d$, and $1-d^2$. A general description of partial-response signaling is given by P. Kabal et al, "Partial Response Signaling", IEEE Transactions on Communications, Vol. COM-23, No. 9, September 1975, pp. 921-934. The meaning of the above polynomials is that the output sample $y_n$ is obtained by multiplying the input sample $a_n$ by the polynomial and adding noise. The symbol d is the delay operator: $da_n = a_{(n-1)}$. For example, $$1-d: y_n = (1-d)a_n + r_n = a_n - a_{(n-1)} + r_n,$$

where $r_n$ is the noise sample.

The foregoing objects are satisfied in that the invention uses only two survivor sequences, and only the difference between the two metrics associated with these survivor sequences is computed and stored. Simplicity and efficiency result because less computing and storage resources are required to process the one difference metric that would have been required to process the two path metrics, and the difference metric cannot grow without bound as the path metrics can. Reliability results from the fact that the detected sequence is chosen by maximum-likelihood sequence estimation. It is the one most likely to cause the observed sequence of sampled values at the receiver. In the case of $1-d^2$ channel, interleaving and pipelining contribute to simplicity and speed of operation. The difference metric provides a convenient means of generating tentative decisions with very little delay. A limiter-decision circuit can be used to facilitate the calculation of the difference metric and the survivor sequences.

The method steps include (a) partitioning the sample values $y_n$ into two separate sequences having even and odd time indices n, respectively, if class-IV partial-response $(1-d^2)$ is being used. In this case, the remaining steps are applied to the even and odd sequences independently of each other. As each sample $y_n$ is received, the operations performed include (b) recursively determining the new pair of survivor sequences and the new difference metric, and (c) producing tentative decisions and final decisions based on the stored survivor sequences and the sign of the difference metric.

DESCRIPTION OF THE PREFERRED EMBODIMENT AND INDUSTRIAL APPLICABILITY

Partial-response signaling is a technique which enforces spectral properties by allowing a controlled amount of intersymbol interference. A survey of partial-response signaling is given in the article by P. Kabal et al, "Partial Response Signaling", IEEE Transactions on Communications, Vol. COM-23, No. 9, September 1975, pp. 921-934. With maximum-likelihood sequence estimation (MLSE), most partial-response schemes perform practically as well as a system without intersymbol interference. Reference is made in the article by H. Kobayashi, "Application of Probabilistic Decoding to Digital Magnetic Recording Systems", stated above. Hence, no penalty has to be paid for the benefit of spectrum shaping, except for the higher complexity of the MLSE decoding hardware which performs the Viterbi decoding process.

Partial-response "class-IV" (PR-IV) signaling leads to spectral nulls at DC and at half of the signaling rate. PR-IV is therefore well suited for channels with baseband-like characteristics, which do not transmit DC. Magnetic recording channels are of this type and PR-IV is therefore regarded as a promising technique to achieve higher storage density in digital magnetic recording systems.

In the following, first the theory of MLSE for PR-IV signaling is reviewed.

In the next section, two types of MLSE receivers with identical performance are discussed, called the whitened-matched filter (WMF) version and the matched filter (MF) version. They differ in the receiver filters used before sampling the received signal at signaling rate, and in the computation of survivor metrics in the Viterbi decoding process.

In another section explaining basic invention features, it is shown that PR-IV sequences can be viewed as two "dicode" sequences which are interleaved, and that each dicode sequence can be decoded independently. For binary systems, as in saturation recording, the state-transition diagram of each dicode scheme exhibits then only two states. Instead of two survivor metrics, it is possible to compute only one difference survivor metric.

In a further section, embodiments are disclosed which are digital implementations of Viterbi decoders utilizing pipelined handling of interleaved PR-IV sequences, some of them using difference survivor metrics. Simplicity and capability for operation at high speed are achieved by decoding the two dicode sequences in an interleaved and pipelined fashion. A dicode decoder is the same as the partial-response class-IV decoder with the interleaving and pipelining removed. A duobinary decoder is similar to a dicode decoder with the signs of certain quantities changed. The discussion focuses on the partial-response class-IV decoder. The changes necessary for the dicode and duobinary cases are given at the end of each section.

Survey of Transmission System

Figure 1:
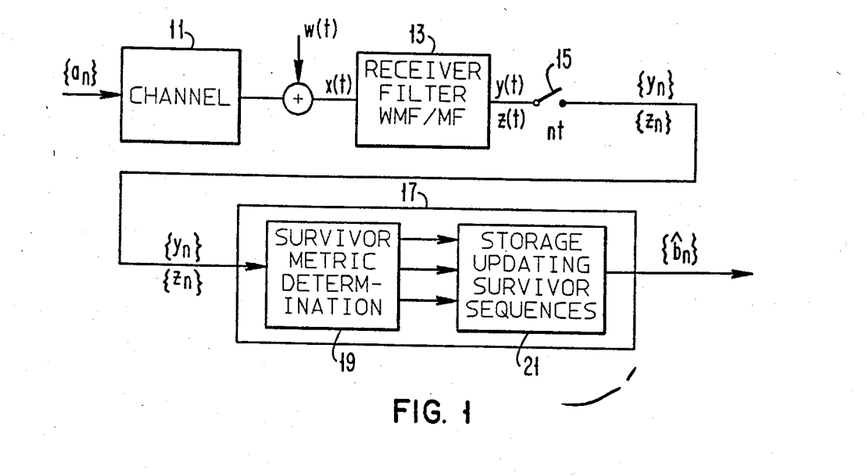
FIG. 1 depicts schematic survey of a transmission/recording system which is the environment for the present invention.

FIG. 1 is a schematic representation of a transmission system in which the present invention finds application.

A sequence of binary values $a_n = +1$ and $a_n = -1$ is transmitted at rate $1/T$ through a channel 11. White noise $w(t)$ is added during transmission. $x(t)$ is the resulting continuous input signal of the receiver.

It should be noted that channel 11 can also be a magnetic recording device, that the white noise $w(t)$ is added during recording and reading, and that $x(t)$ is the output signal of a magnetic reading transducer. Signal $x(t)$ is applied to a receiver filter 13. For the present case, this may be either a whitened-matched filter (WMF), or a matched filter (MF), as will be explained later.

The filter output is a continuous signal $y(t)$ or $z(t)$, depending on the type of filter.

The filter output signal is sampled at regular intervals $T$ by sampling means 15. The result is a sequence of time-discrete samples $y_n$ or $z_n$, respectively.

These samples are furnished to a Viterbi decoder 17 in which they are used in a maximum-likelihood sequence estimation (MLSE) process to obtain binary output values $b_n$ with a given delay. Viterbi decoder 17 essentially comprises a section 19 for survivor metric determination and tentative selection of binary output values, and a section 20 for storage and updating of survivor sequences which allows final selection of the binary output values.

The present invention is concerned with the means for MLSE decoding contained in Viterbi decoder 17.

In the sequel, some theoretical explanations will be given prior to the detailed description of the invention and the selected embodiments.

PR-IV Signaling

As shown in FIG. 1, PR-IV signaling results from sending a data sequence $(a_n)$ at the rate $1/T$ through a channel whose response to an isolated input $a_0 = +1$ is given by $$h(t) = \frac{\sin(\pi t/T)}{\pi t/T} - \frac{\sin[\pi(t - 2T)/T]}{\pi(t - 2T)/T} . \quad (1)$$

In the frequency domain, this corresponds to the channel transfer characteristics $$H(f) = \begin{cases} T[1 - \exp(-j4\pi fT)], & |f| < \tfrac{1}{2}T, \\ 0 & \text{otherwise.} \end{cases} \quad (2)$$

At the output of the channel the received signal becomes $$x(t) = \sum_k a_k h(t - kT) + w(t), \quad (3)$$

where w(t) is assumed to be additive wide-band white noise. The above description of a PR-IV transmission system applies as well to a magnetic recording system where in the case of saturation recording the data amplitudes are binary: $a_n = \pm 1$. Only a modest amount of equalization is required to shape the actual read signal into the form described by (1) and (3). In practice, this equalization can be regarded as being combined with the further filtering required prior to signal sampling and detection.

Figure 2:
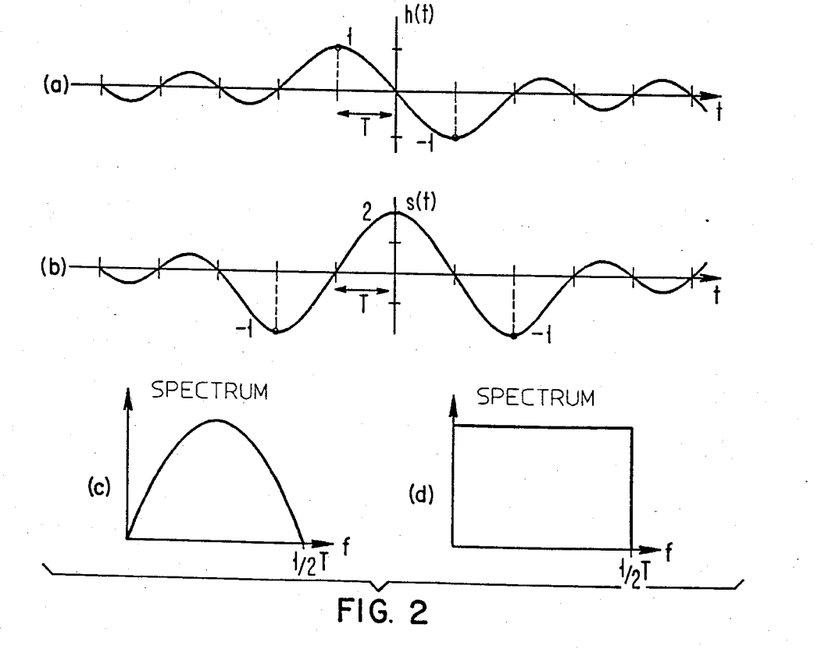
FIG. 2 sets out impulse responses and transmission spectra of channels and filters in the system of FIG. 1.

The function h(t) is shown in FIG. 2(a). The transmission characteristic of the channel is depicted in FIG. 2(c).

Two MLSE Receiver Versions

Two receiver versions for PR-IV signals are described. They are equivalent in that both perform true maximum-likelihood sequence estimation (MLSE). As mentioned above, they differ in the receiver filters used.

The whitened-matched filter (WMF) version is more commonly known. In the particular case of the signal being given by (3), the WMF to be used as a receiver filter is just an ideal low-pass filter with cutoff frequency $\tfrac{1}{2}T$. Its transmission characteristic is shown in FIG. 2(d). The output of this filter is given by $$y(t) = \sum_k a_k h(t - kT) + r(t), \quad (4)$$

where h(t) was defined by (1) and has a shape as shown in FIG. 2(a), and r(t) denotes white noise band-limited to $\tfrac{1}{2}T$.

For the matched filter (MF) version, the receiver filter is matched to the channel characteristic given by (2), i.e. it has a characteristic as shown in FIG. 2(c). Thus, if causality is ignored, the receiver filter exhibits the transfer function $$P(f) = \frac{1}{T}\overline{H(f)} = \begin{cases} [1 - \exp(+j4\pi fT)], & |f| < \tfrac{1}{2}T, \\ 0 & \text{otherwise.} \end{cases} \quad (5)$$

The overall response of the channel and MF to an isolated input $a_o = +1$ is then given by $$s(t) = \frac{8T^3}{\pi t} \frac{\sin(\pi t/T)}{4T^2 - t^2}, \quad (6)$$

and the signal observed at the output of the MF becomes $$z(t) = \frac{1}{T} h(-t) * y(t) = \sum_k a_k s(t - kT) + P(t). \quad (7)$$

The noise p(t) is band-limited to $\tfrac{1}{2}T$ and correlated. The function s(t) is shown in FIG. 2(b).

Sampling the outputs of the WMF and the MF at times nT, leads, respectively, to the sampled signals $$y_n = a_n - a_{n-2} + r_n, \quad (8)$$

$$z_n = -a_{n-2} + 2a_n - a_{n-2} + q_n = -y_{n-2} + y_n. \quad (9)$$

The last equality in (9) expresses the fact that the MF output samples could also be obtained by digital filtering of the WMF output signals.

In the WMF case, the noise samples ($r_n$) are uncorrelated. The most likely transmitted sequence ($\hat{a}_n$) is the binary sequence $a_n' = \pm 1$ which minimizes $$\sum_k [y_k - (a_k' - a_{k-2}')]^2 = \quad (10)$$

$$\sum_k y_k^2 + a_k'^2 + a_{k-2}'^2 - 2[y_k(a_k' - a_{k-2}') + a_k' a_{k-2}'].$$

$a_k'$ designates here an undetermined value. It may be either $+1$ or $-1$. The most likely sequence ($\hat{a}_k$) for a given sequence of received samples ($y_k$) is the one which when substituted for the $a_k''s$ in equation (10) yields the minimum sum $y_k + a_k' + a_{k-2}'$.

The squared terms of the right-hand side of (10) are identical for all sequences ($a_n'$). Hence, minimization of (10) is equivalent to maximizing the cost function $$J = \sum_k y_k a_k' - y_k a_{k-2}' + a_k' a_{k-2}'. \quad (11)$$

For the MF case, an equivalent cost function is obtained by replacing in the term $y_k a_{k-2}'$ of (11) the index k by k+2, which does not change the result of the summation. Replacing then from (9) $y_k - y_{k+2}$ by $z_k$ leads to $$J = \sum_k a_k'(z_k + a_{k-2}'). \quad (12)$$

In the sequel, the following notation is used for the cost function:

$$J = \sum_k v_k(a_k', a_{k-2}') \quad (13)$$

where the auxiliary function $v_k$ is defined as $$v_k(a_k', a_{k-2}') = \begin{cases} y_k(a_k' - a_{k-2}') + a_k' a_{k-2}' & \text{WMF case,} \quad (14) \\ z_k a_k' + a_k' a_{k-2}' & \text{MF case.} \quad (15) \end{cases}$$

The sequence which maximizes J is determined by the Viterbi decoding algorithm.

BASIS OF INVENTION

Interleaving of Subsequences (Dicode Sequences)

The cost function J can be rewritten as $$J = JE + JO = \sum_{k \text{ even}} v_k(a_k', a_{k-2}') + \sum_{k \text{ odd}} v_k(a_k', a_{k-2}'). \quad (16)$$

Hence, its maximization can be carried out separately for JE with respect to ($a_k'$, k even), and for JO with respect to ($a_k'$, k odd).

Figure 3:
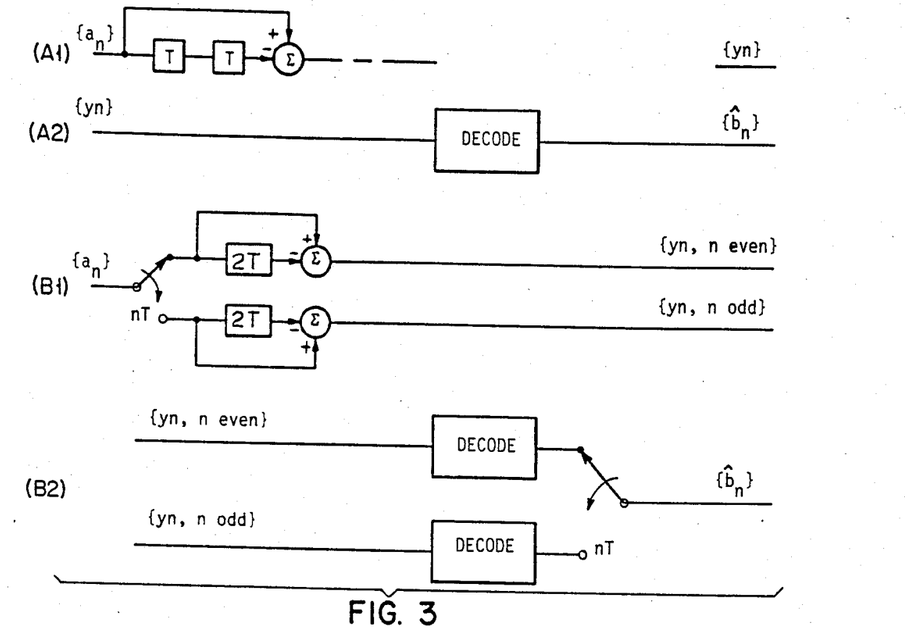
FIG. 3 shows a schematic representation of the separate handling of interleaved sequences in the decoder.

As illustrated in FIG. 3, this point of view corresponds to treating PR-IV sequences characterized by the polynomial $1-D^2$, where D refers to a delay T, as two independent interleaved "dicode" partial-response sequences with polynomial $1-D$, where D refers to a delay of 2T. (For an explanation of dicode sequences, refer to the above-mentioned article by P. Kabal et al, "Partial Response Signaling".) A Viterbi decoder operating in an interleaved fashion on the two dicode schemes requires for each scheme only two states.

Viterbi Decoding of Interleaved Dicode Sequences

The Viterbi algorithm is now developed as it applies to one of the two interleaved dicode systems. Hence, in the following derivation indices are either even or odd. A general description of the Viterbi algorithm is given in the above-mentioned article by G. Forney, "The Viterbi Algorithm", and in a publication by J. F. Hayes, "The Viterbi Algorithm Applied to Digital Data Transmission", Communication Society Magazine, Vol. 13, March 1975, pp. 15-20.

Figure 4:
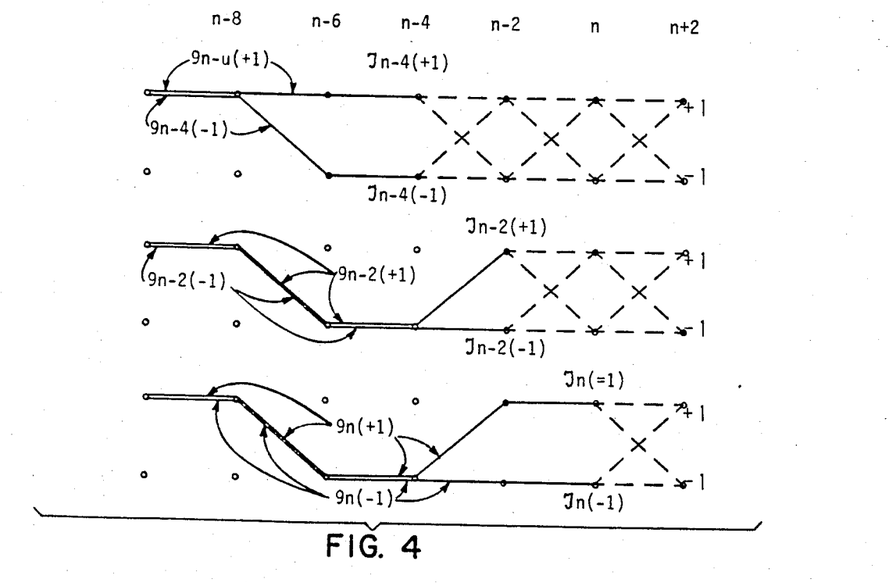
FIG. 4 constitutes trellis diagrams for consecutive states of the survivor sequences in the decoder.

The Viterbi algorithm for one dicode system is illustrated in FIG. 4. It determines in a two-state trellis diagram the sequence ..., $\hat{a}_{n-2}$, $\hat{a}_n$, $\hat{a}_{n+2}$, ... which maximizes JE or JO as given by (13). This is accomplished by recursively computing for each time n two "survivor metrics"

$$J_n(a_n') = \max_{(\ldots, a_{n-4}', a_{n-2}')} \sum_{k \leq n} v_k(a_k', a_{k-2}'), \; a_n' = +1, -1, \quad (17)$$

which represent the maximum cost up to time n, for an hypothesized last symbol $a_n' = +1$ and $-1$, respectively. The optimum sequences resulting from (17) are called the "survivor sequences", denoted by $$q_n(a_n') = [\ldots, a_{n-4}(a_n'), a_{n-2}(a_n')], \; a_n' = +1, -1. \quad (18)$$

The survivor metrics and associated survivor sequences are extended by the recursion $$J_n(a_n') = \max_{a_{n-2}' = +1, -1} [J_{n-2}(a_{n-2}') + v_n(a_n', a_{n-2}')], \quad (19)$$

$$q_n(a_n') = \{q_{n-2}[\hat{a}_{n-2}(a_n')], \hat{a}_{n-2}(a_n')\}, \; a_n' = +1, -1, \quad (20)$$

where $\hat{a}_{n-2}(a_n')$ is the value of $a_{n-2}'$ which maximizes the right-hand side of (19). The recursion of survivor metrics for the WMF and MF version are explicitly given below.

WMF Version:

$$J_n(+1) = \max[J_{n-2}(+1)+1; J_{n-2}(-1)+2y_n-1] \quad (21)$$

$$J_n(-1) = \max[J_{n-2}(+1)-2y_n-1; J_{n-2}(-1)+1] \quad (22)$$

MF Version:

$$J_n(+1) = \max[J_{n-2}(+1)+z_n+1; J_{n-2}(-1)+z_n-1] \quad (23)$$

$$J_n(-1) = \max[J_{n-2}+1)-z_n-1; J_{n-2}(-1)-z_n+1] \quad (24)$$

Using Difference of Survivor Metrics

The Viterbi decoding process for binary dicode sequences can be significantly simplified by considering not the pairs of explicit survivor metrics but only the difference between the survivor metrics, i.e.

$$DJ_n = [J_n(+1) - J_n(-1)]/2. \quad (25)$$

From FIG. 4, it can be seen that four possible extensions of the survivor sequences are to be considered:

(a) $\hat{a}_{n-2}(a_n' = +1) = +1,$ (26)

$\hat{a}_{n-2}(a_n' = -1) = +1$ (b) $\hat{a}_{n-2}(a_n' = +1) = +1,$

$\hat{a}_{n-2}(a_n' = -1) = -1$ (c) $\hat{a}_{n-2}(a_n' = +1) = -1,$ $\hat{a}_{n-2}(a_n' = -1) = -1$ (d) $\hat{a}_{n-2}(a_n' = +1) = -1,$ $\hat{a}_{n-2}(a_n' = -1) = +1$ The corresponding path selections are indicated on the right.

Considering the above four cases, and observing (21)-(25), allows the determination of the following recursions for the difference survivor metrics:

WMF Version:

(27)

$$DJ_n = \begin{cases} y_n + 1 & \text{if } +1 \leq (DJ_{n-2} - y_n) \quad (a) <=> \\ DJ_{n-2} & \text{if } -1 < (DJ_{n-2} - y_n) < +1 \; (b) <=> \\ y_n - 1 & \text{if } \quad (DJ_{n-2} - y_n) \leq -1 \; (c) <=> \end{cases}$$

MF Version:

(28)

$$DJ_n = \begin{cases} z_n + 1 & \text{if } +1 \leq DJ_{n-2} \quad (a) <=> \\ z_n + DJ_{n-2} & \text{if } -1 < DJ_{n-2} < +1 \; (b) <=> \\ z_n - 1 & \text{if } \quad DJ_{n-2} \leq -1 \; (c) <=> \end{cases}$$

The conditions in the above recursions reveal that extension (d) can never occur. The non-occurrence of this extension can be seen in FIG. 4. The theoretical background for the dicode (1−d) and the duobinary (1+d) systems is similar to that given in equations (1)–(28). The following summarizes the differences and gives the final results. The equations corresponding to (27) and (28) are directed to the dicode and duobinary cases.

The processing of samples from a dicode channel is the same as the processing of the even (or odd) subsequence described for partial-response class-IV. The dicode versions of equations (8)–(28) are obtained by changing all occurrences of time indices n+2, k+2, n−2, and k−2, n+1, k+1, n−1, and k−1, respectively. Splitting into even and odd subsequences as described by equation (16) is omitted. The recursions for the survivor metrics corresponding to equations (27) and (28) are:

WMF Dicode Version:

$$DJ_n = \begin{cases} y_n + 1 \text{ if } +1 \leq (DJ_{n-1} - y_n) & (a) <=> \\ DJ_{n-1} \text{ if } -1 < (DJ_{n-1} - y_n) < +1 & (b) <=> \\ y_n - 1 \text{ if } \phantom{+1<} (DJ_{n-1} - y_n) \leq -1 & (c) <=> \end{cases} \quad (27a)$$

MF Dicode Version:

$$DJ_n = \begin{cases} z_n + 1 \text{ if } +1 \leq DJ_{n-1} & (a) <=> \\ z_n + DJ_{n-1} \text{ if } -1 < DJ_{n-1} < +1 & (b) <=> \\ z_n - 1 \text{ if } \phantom{+1<} DJ_{n-1} \leq -1 & (c) <=> \end{cases} \quad (28a)$$

The duobinary versions of equations (8)–(28) can be obtained from the dicode versions by changing the signs of certain terms. For example, (8) and (9) become:

$$y_n = a_n + a_{n-1} + r_n$$

$$z_n = a_{n+1} + 2a_n + a_{n-1} + p_n = y_{n+1} + y_n.$$

The recursions for the difference survivor metrics for duobinary are:

WMF Duobinary Version:

$$DJ_n = \begin{cases} y_n + 1 \text{ if } -1 \geq (DJ_{n-1} - y_n) & (a) <=> \\ -DJ_{n-1} \text{ if } +1 > (DJ_{n-1} - y_n) > -1 & (b) <=> \\ y_n - 1 \text{ if } \phantom{+1>} (DJ_{n-1} - y_n) \geq +1 & (c) <=> \end{cases} \quad (27b)$$

MF Duobinary Version:

$$DJ_n = \begin{cases} z_n + 1 \text{ if } -1 \geq DJ_{n-1} & (a) <=> \\ z_n - DJ_{n-1} \text{ if } +1 > DJ_{n-1} > -1 & (b) <=> \\ z_n - 1 \text{ if } \phantom{+1>} DJ_{n-1} \geq +1 & (c) <=> \end{cases} \quad (28b)$$

Embodiments of MLSE Decoders

In the following section, embodiments of the Viterbi decoder or MLSE decoder 17 which incorporate the invention are described. As shown generally in FIG. 1, the Viterbi decoder consists of a first section 19 for determining survivor metrics and for obtaining intermediate and tentative values for the receiver output signal, and a second section 21 for storing and updating the survivor sequences furnished by section 19, and for making the final selection of output values.

Figure 5:
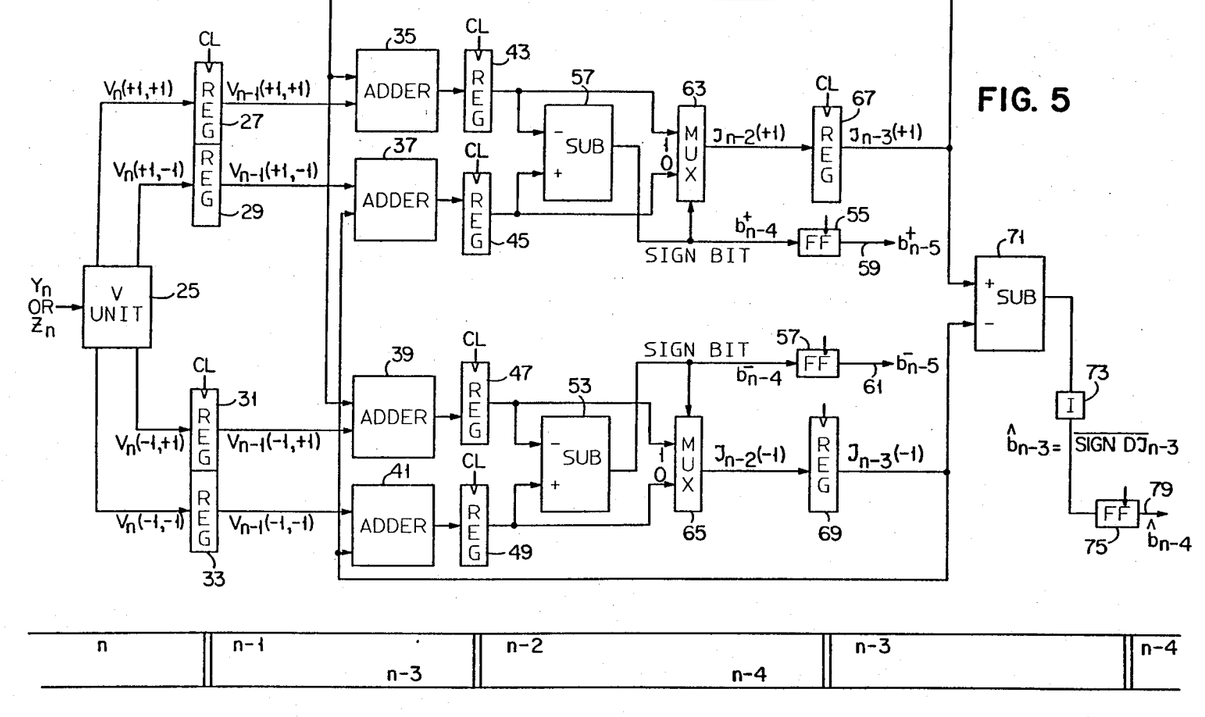
FIG. 5 shows a block diagram of a first embodiment comprising circuitry for determining pairs of survivor metrics for two interleaved dicode sequences.
Figure 6:
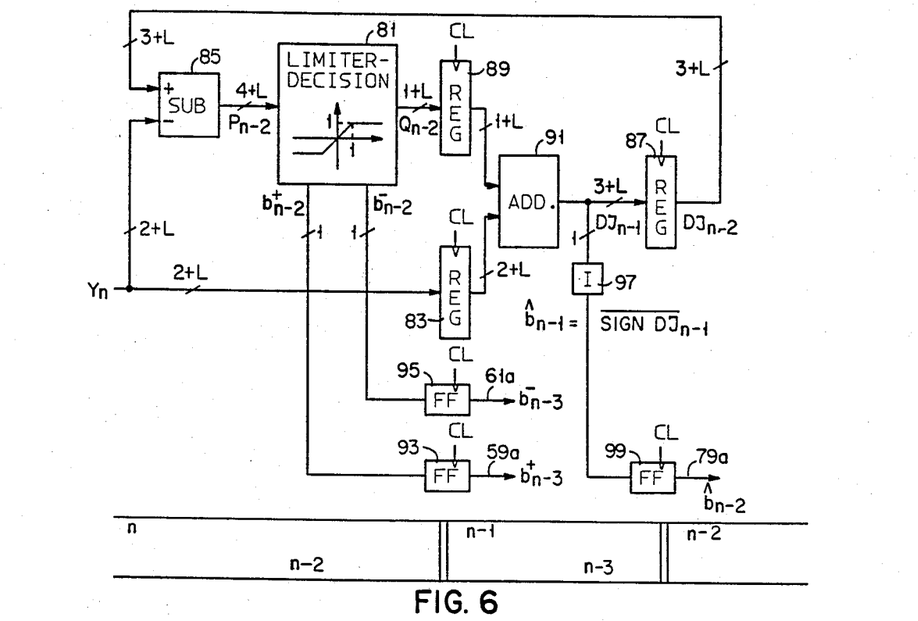
FIG. 6 shows a block diagram of a second embodiment comprising circuitry for determining survivor metric differences in a whitened-matched filter receiver.
Figure 7:
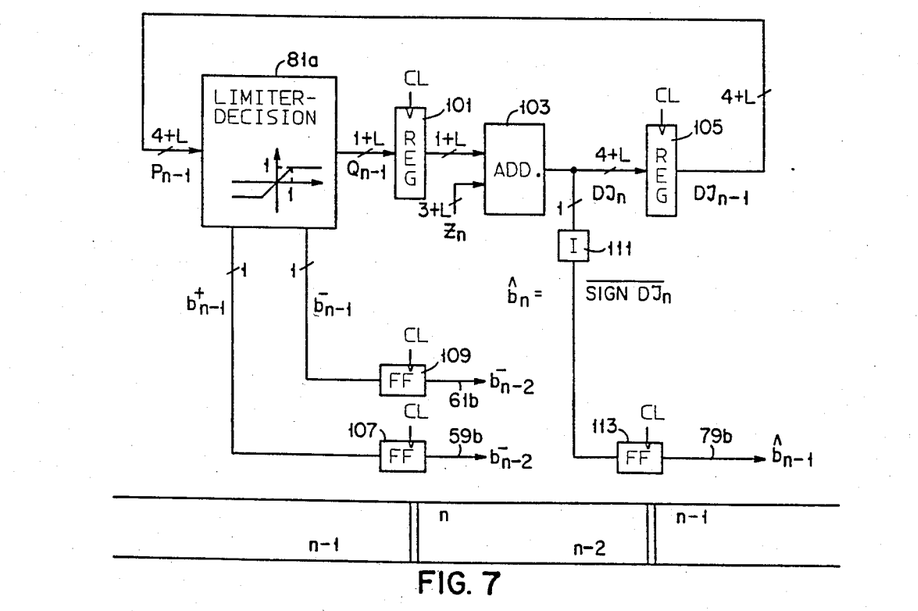
FIG. 7 shows a block diagram of a third embodiment comprising circuitry for determining survivor metric differences in a matched filter receiver.

Three embodiments are disclosed for section 19, in connection with FIGS. 5, 6, and 7. A suitable implementation of a limiter-decision circuit used in the second and third embodiments will be disclosed with reference to FIG. 8. Finally, one implementation of section 21 is explained and shown in FIG. 9. Each of these embodiments is described first for the partial-response class-IV channel. The modifications necessary to convert them to dicode and duobinary are described at the end.

It should be noted that the digital circuitry discussed in the following generates binary output quantities which assume either value 0 or 1, and are therefore designated as "$b_n$" or "$\hat{b}_n$". In the previous discussion, the signal elements were amplitudes which assume either value +1 or −1, and they are designated as "$a_n$" or "$\hat{a}_n$".

The transition from one form to the other is formally given below in equations (29) and (30).

FIRST EMBODIMENT

Circuitry for Determining Two Survivor Metrics

In FIG. 5, an embodiment of section 19 of the Viterbi decoder is shown which determines two survivor metrics for the two states of the decoder, and which furnishes intermediate values $b^+_{n-5}$, $b^-_{n-5}$ and a tentative output value $\hat{b}_{n-4}$ for further handling in section 21. This circuitry is suited for both the WMF case and the MF case and implements the function given in equation (19).

It comprises V unit 25 which computes for an applied input value $y_n$ or $z_n$, the value of auxiliary function $v_n$ ($a_n'$, $a_{n-2}'$) according to either equation (14) or (15). Values $a_n$ and $a_{n-2}$, which are assumed received amplitude values, can both be $+1$ as well as $-1$ so that V unit 25 for each input value furnishes four output values which are stored in clocked registers 27, 29, 31, and 33. These $v_n$ values can be considered metric increments because they have to be added to the survivor metrics previously accumulated.

Four adders 35, 37, 39, and 51 are provided for adding the contents of registers 27 ... 33, i.e. the four previously stored values of $v_{n-1}$, and two previously determined metric values $J_{n-3}$, as required by equation (19). The results are stored in clocked registers 43, 45, 47, and 49, respectively. For determining the maximum value for each pair of register contents, two subtractors 51 and 53 are provided. They determine the sign bit of the difference of the respective pair of values, and furnish these as binary values $b^+{}_{n-4}$ and $b^-{}_{n-4}$ to two flipflop circuits 55 and 57. Previously stored contents of these two flipflops represent the two intermediate values $b^+{}_{n-5}$ and $b^-{}_{n-5}$, which are furnished on lins 59 and 61 as output values of section 19.

The formal relationship between decoded values $\hat{a}_{n-5}$ and the actual binary output values $\hat{b}_{n-5}$ is as follows:

$$b_{n-5}^{\pm} = \begin{cases} 1 \text{ for } \hat{a}_{n-5}(\pm 1) = +1 \\ 0 \text{ for } \hat{a}_{n-5}(\pm 1) = -1 \end{cases} \quad (29)$$

With the aid of multiplexers or gating circuits 63 and 65, the sign bits available at the outputs of subtractors 51 and 53 select the maximum of each pair of values stored in registers 43/45 and 47/49, respectively, and furnish the resulting two values as metric values $J_{n-2}(+1)$ and $J_{n-2}(1)$ to clocked registers 67 and 69. The previously stored values in these registers, $J_{n-3}(+1)$ and $J_{n-3}(-1)$, are on one hand furnished to adders 35 ... 41 as was previously mentioned. On the other hand, they are furnished to a subtractor 71 which on its output delivers the sign bit of the difference $DJ_{n-3}$. This sign bit is complemented in inverter circuit 73 and the result is transferred as binary value $\hat{b}_{n-3}$ to flipflop circuit 75. The previously stored contents of this flipflop represent the tentative decoder output value $\hat{b}_{n-4}$ which is furnished on line 79 as the third output value of section 19.

The formal relationship between survivor metrics $J_{n-4}$ and the tentative binary output values $\hat{b}_{n-4}$ is as follows:

$$\hat{b}_{n-4} = \begin{cases} 1 \text{ for } J_{n-4}(+1) \geq J_{n-4}(-1) \\ 0 \text{ otherwise.} \end{cases} \quad (30)$$

It should be noted that the survivor metrics are not normalized but are allowed to wrap around the maximum values in their two's complement representation. With a sufficient word length, the add and subtract operations will still produce correct results.

At the bottom of FIG. 5, boxes with indices are shown which illustrate the fact that the circuitry has separate stages. Each of the double vertical lines indicates where the circuitry comprises storage units that separate stages. At any time, each section contains only values either with even indices or with odd indices. At each clock time, the whole contents are shifted from one stage to the next for further processing, but no mixing between odd and even indexed values occurs.

This shows that in the whole circuity, two subsequences with odd and even indices, respectively, are handled completely separately as indicated in FIG. 3, but in an interleaved and pipelined manner. Nevertheless, the sequence of input values and the sequence of output values are continuous, i.e. they need not be expressly separated into two subsequences because this splitting occurs automatically within the circuit of FIG. 4 due to the separation of stages by clocked storage units, and due to suitable feedback between stages.

SECOND EMBODIMENT

Circuitry Determining Difference Survivor Metric for WMF Version

FIG. 6 shows an embodiment of section 19 of the Viterbi decoder which does not explicitly determine the two survivor metrics but only their difference. This second embodiment is suited for the WMF (whitened-matched filter) version of the receiver, i.e. the version producing receiver samples $y_n$ (equation 8). The circuitry implements equation (27).

The quantity shown next to each line in FIG. 6 indicates the number of bits transferred on that line in parallel. In the absence of noise, the samples $y_n$ can assume three possible values, i.e. levels $-2, 0, +2$ (see equation 8). Thus, if the range $-4 \leq y_n < +4$ should be covered, and intervals between adjacent levels are divided into $2^L$ sublevels, $L+2$ bits are required to represent $y_n$ in a two's complement representation.

For soft decoding, the value for L should be chosen between 2 and 4.

Figure 8:
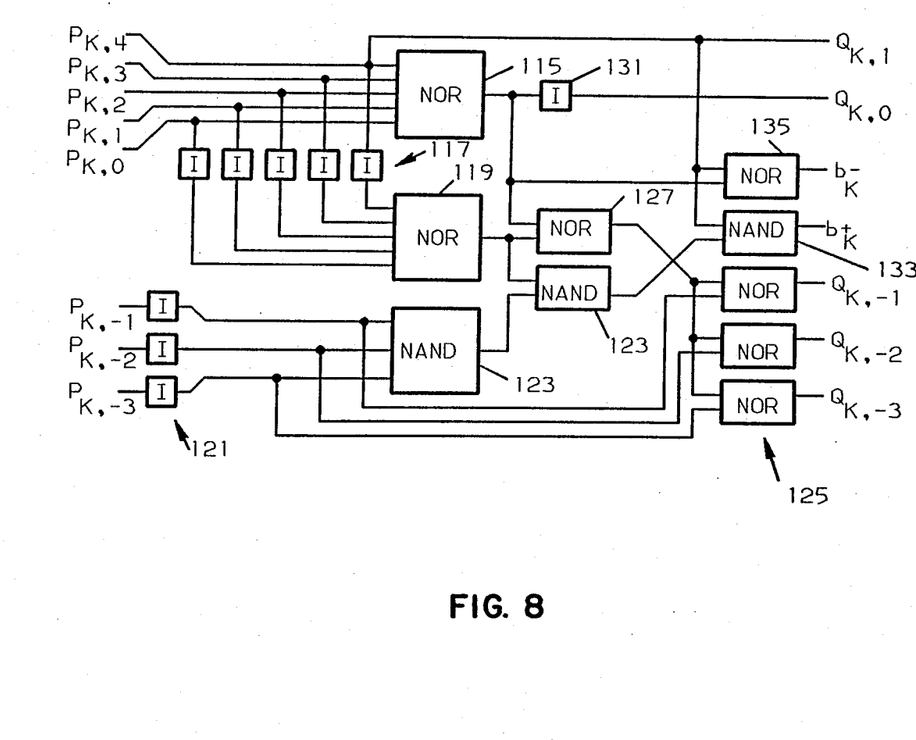
FIG. 8 shows a block diagram of a limiter-decision unit for the circuitry of FIGS. 6 and 7.

An important portion of the circuitry of FIG. 6 is the limiter-decision unit 81. With the aid of this unit, intermediate values $b^+{}_k$ and $b^-{}_k$ (as defined in equation 29) are obtained with shorter processing delay. Limiter-decision unit 81 generates from an input sample $P_k$ an output sample $Q_k$ and intermediate values $b^+{}_k$ and $b^-{}_k$ in accordance with the following rule:

(a) $(Q_k = +1, b_k^+ = 1, b_k^- = 1)$ if $+1 \leq P_k$     (31)

(b) $(Q_k = P_k, b_k^+ = 1, b_k^- = 0)$ if $-1 < P_k < +1$ (c) $(Q_k = -1, b_k^+ = 0, b_k^- = 0)$ if $P_k \leq -1$ Limiter-decision unit 81 can be implemented either as a read-only store (ROS), as a programmable logic array (PLA), or by discrete logic. An example is shown in FIG. 8 and will be explained later.

Referring again to FIG. 6, an input value $y_n$ is stored in clocked register 83 and also furnished to one input of subtractor 85. The other input of subtractor 85 receives a previously obtained survivor metric difference value $DJ_{n-2}$ which is stored in clocked register 87. The output of subtractor 85 is sample $P_{n-2}$ which indicates in which of three regions the difference falls, i.e. whether the first, second, or third condition of equations (27) and (31) applies. The output value $Q_{n-2}$ of limiter-decision unit 81 is stored in a clocked register 89. Contents of registers 83 and 89 are added in adder 91 to obtain a new survivor metric difference value $DJ_{n-1}$ in accordance with equation (27), which is then stored in register 87.

Limiter-decision unit 81 also furnishes the two binary intermediate values $b^+{}_{n-2}$ and $b^-{}_{n-2}$ which are stored in flipflop 93 and 95, respectively. Previously stored binary intermediate values $b^+{}_{n-3}$ and $b^-{}_{n-3}$ are available on output lines 59a and 61a, which also constitute two of the outputs of the whole circuitry of FIG. 6.

One output line of adder 91, i.e. the one carrying the sign bit, is connected to an inverter 97 which complements the sign of $DJ_{n-1}$. This complement is the tentative output value $\hat{b}_{n-1}$ which is stored in flipflop 99. The previously stored tentative output value $\hat{b}_{n-2}$ is available on line 79a which constitutes the third output of the whole circuitry.

Similar as for FIG. 5, also at the bottom of FIG. 6 boxes with indices are shown. These boxes indicating separate stages and intermediate clocked storage units also illustrate the interleaved and pipelined handling of two sequences of alternating samples. A comparison between FIG. 5 and FIG. 6 reveals that fewer stages are required for the circuitry of FIG. 6, thus it has less delay and needs less hardware.

THIRD EMBODIMENT

Circuitry Determining Difference Survivor Metrics for MF Version

A third embodiment of section 19 of the Viterbi decoder is illustrated in FIG. 7. It also directly determines the survivor metric difference value $DJ_k$. The third embodiment is suited for the MF (matched filter) version of the receiver, i.e. it operates with receiver samples $z_n$ as defined in equation (9), and it implements equation (28).

In the MF case, sample values $z_n$ assume (without noise) the five levels $-4, -2, 0, +2, +4$ in accordance with equation (9). Thus, assuming again 2sublevels, $L+3$ bits are needed to represent $z_n$ in the range $-8 \leq z_n < +8$.

The circuitry of FIG. 7 comprises the same limiter-decision unit as the circuitry of FIG. 6. Here, this unit has reference number 81a (detailed embodiment shown in FIG. 8). The output same $Q_{n-1}$ of unit 81a is stored in clocked register 101. Adder 103 is provided to combine the previous sample $Q_{n-2}$ from register 101 and the input value $z_n$ to obtain a new survivor metric difference value $DJ_n$ which is to be stored in clocked register 105. The previous survivor metric difference $DJ_{n-1}$ is furnished from register 105 directly to the input of limiter-decision unit 81 as sample $P_{n-1}$.

Two outputs of limiter-decision unit 81 furnish the binary intermediate values $b^+{}_{n-1}$ and $b^-{}_{n-1}$ which are stored in flipflop 107 and 109, respectively.

Contents of these flipflops are furnished as intermediate values $b^+{}_{n-2}$ and $b^-{}_{n-2}$ on output lines 59b and 61b, respectively. The sign bit output line of adder 103 of $DJ_n$ furnishes tentative output value $\hat{b}_n$. The latter is stored in flipflop 113. The previously stored binary value $\hat{b}_{n-1}$ is furnished from flipflop 113 to output line 79b. The output lines 59b and 79b are connected to the inputs of the survivor sequence storage and updating section 21 shown in FIG. 9, as will be explained later.

The blocks at the bottom of FIG. 7 with indices inserted illustrate also for this case the different stages of the circuitry separated by clocked storage units, which enable the pipelined and interleaved processing of the two dicode subseqeunces.

A comparison of FIGS. 5, 6, and 7 immediately reveals that among the three metric-computation schemes presented, the MF version with difference metric calculation (FIG. 7) offers the lowest circuit complexity, capability of operation at highest signaling rate (from a circuit delay consideration), and shortest delay in producing binary decision values.

Another advantage of the second and third embodiments over the first is that the difference metric is automatically normalized. Equations (27) and (28) show that it does not accumulate as the individual survivor metrics do. There is no need to provide extra word length to allow for wrap around.

Limiter-Decision Unit

FIG. 8 shows an embodiment of limiter-decision unit 81/81a for the case $L=4$ comprising discrete logic circuits. As mentioned previously, this unit implements equation (31).

It has eight inputs for the eight bits of a sample $P_k$ which is presented in binary two's complement notation (most significant bit $P_{k,4}$ in the position having value $2^4$, least significant bit $P_{k,-3}$ in the position having value $2^{-3}$). Similarly, five outputs are provided for the five bits of a sample $Q_k$ in binary two's complement notation ($Q_{k,1}$ is most significant bit in the position having value $2^1$, $Q_{k,-3}$ is least significant bit in the position having value $2^{-3}$). Furthermore, two outputs for binary intermediate values $b^+{}_k$ and $b^-{}_k$ are provided.

The five input lines for the most significant bits of $P_k$ (integer portion) are connected to the inputs of a first NOR circuit 115 and also through a group of inverters 117 to the inputs of a second NOR circuit 119. The three input lines for the least significant digits of $P_k$ (fractional portion) are connected through a group of inverters 121 to the inputs of an NAND circuit 123 and to the inputs of a group of three NOR circuits 125. The outputs of NOR circuits 115 and 119 are combined in an NOR circuit 127, and the outputs of NOR circuit 119 and NAND circuit 123 are combined in an NAND circuit 129.

The two output lines for the most significant digits of $Q_k$ (integer portion) are connected directly to the most significant input line of $P_k$ and through an inverter 131 to the output of NOR circuit 115, respectively. The three output lines for the least significant bits of $Q_k$ (fractional portion) are connected to the outputs of the three NOR circuits 125 whose second inputs are connected to the output of NOR gate 127.

The output line for the first binary intermediate value $b^+{}_k$ is connected through an NAND circuit 133 directly to the output of NAND circuit 129 and to the input line of the most significant $P_k$ bit, and the output line for the second binary intermediate value $b^-{}_k$ is connected through an NOR circuit 135 directly to the output of NOR circuit 115 and also the input line of the most significant $P_k$ bit.

Circuitry for Storage and Updating of Survivor Sequences

Figure 9:
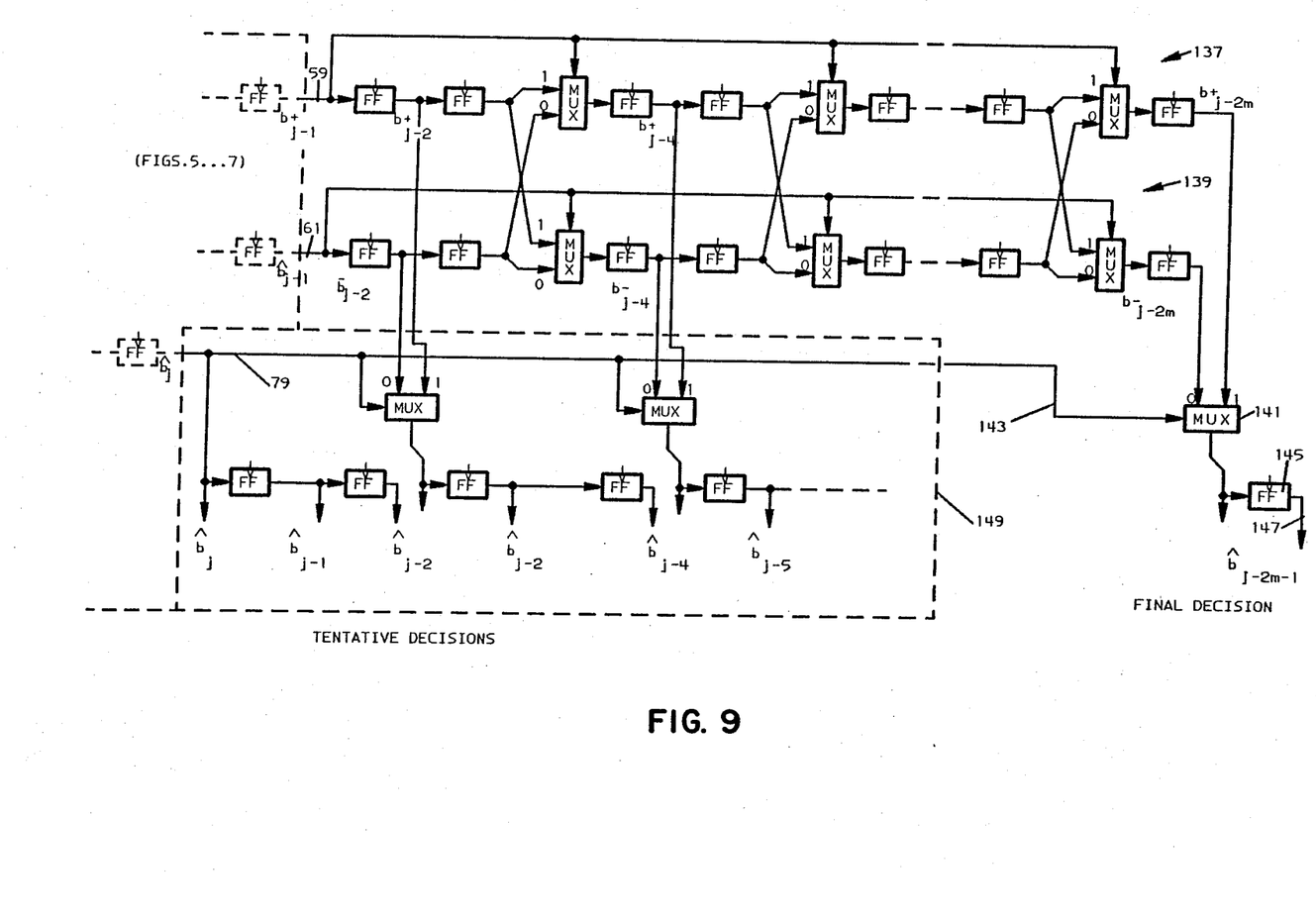
FIG. 9 shows a block diagram of the shift register and selection circuitry for storage and updating of survivor sequences.

Details of section 21 of the Viterbi decoder 17, for the storage and updating of survivor sequences, are shown in FIG. 9. In consists essentially of two shift registers 137 and 139 each comprising $2m-1$ flipflop stages arranged in sequence. Every second flipflop is connected to its successor through a multiplexer or gating circuit that allows to selectively transfer to the successor flipflop either the bit from the preceding flipflop stage of the same shift register or the bit from the corresponding flipflop stage of the other shift register. The control inputs of all multiplexers/gating circuits of one shift register are commonly connected to the input of the respective shift register, i.e. the binary value of the bit just inserted into the first stage of a shift register also determines the selections made by all multiplexers/gating circuits of the respective shift register.

The output flipflop stages of both shift registers are connected to an additional multiplexer/gating circuit 141 which is controlled by a binary signal on selection control line 143. The output value of multiplexer/gating circuit 141 is stored in a final flipflop stage 145 having output line 147 for finally selected output bits $\hat{b}_{j-2m-1}$.

As shown in FIG. 9, inputs of the two shift registers 137 and 139 are connected to the two intermediate value outputs ($b^+_{j-1}$) and ($b^-_{j-1}$) of section 19, i.e. output lines 59/59a/59b and 61/61a/61b of FIGS. 5, 6 or 7, respectively. Selection control line 143 is connected to the tentative output value line ($\hat{b}_j$) of section 19, i.e. output line 79/79a/79b of FIGS. 5, 6, or 7, respectively.

Operation is as follows. The two shift registers store the two binary sequences which have the highest probability of being similar to the transmitted sequence ($a_n$). Each sampling time two new intermediate values $b^+_{j-1}$ and $b^-_{j-1}$ appear which are inserted into the two shift register inputs and control the multiplexer selections during shifting of the two shift registers, thereby updating the stored survivor sequences and thus improving their likelihood with respect to the actually transmitted sequence of binary values ($a_n$). Of the two oldest bits leaving the shift registers, only one is selected each sampling time by the newest tentative output value $\hat{b}_j$ appearing at the output of section 19 and thus on selection control line 143.

The finally selected bits are furnished sequentially on line 147 which is the output line of the whole Viterbi decoder 17.

Section 21 shown in FIG. 9 has an additional portion 149 for providing a sequence of tentative output values which is required for timing recovery and gain control in the receiver. This section comprises an additional group of 2m−1 flipflops, each corresponding to one flipflop stage in the two shift registers 137 and 139 (except the last stage). The flipflops are arranged in pairs as shown, and the input of each pair (except the first one) is connected to a multiplexer/gating circuit whose two inputs are connected to the output of an associated flipflop stage in the first (137) and second (139) shift register, respectively.

The control inputs of all multiplexers in portion 149 as well as the input to the first pair of flipflops are connected to control line 149, i.e. to output line 79 (or 79a, 79b) of survivor metric section 19. Thus, the outputs of all flipflops in portion 149 together with the output of flipflop 145 deliver, at each sampling time, a sequence of tentative output values $\hat{b}_j, \hat{b}_{j-1}, \ldots, \hat{b}_{j-2m-1}$ which is not equal but already very similar to the final output sequence appearing sequentially on line 147. It is available, however, much earlier than the final output sequence and thus much more useful for timing and gain control required at the input of the receiver.

As was mentioned earlier, indices j and j−1 at the inputs of FIG. 9 correspond to indices n−4 and n−5 at the outputs of FIG. 5, to indices n−2 and n−3 at the outputs of FIG. 6, and to indices n−1 and n−2 at the outputs of FIG. 7, respectively. Thus, in FIG. 9, the index j can be replaced by n−4, n−2, or n−1, depending on whether the binary decision values $b^+_{j-1}$, $b^-_{j-1}$, and $\hat{b}_j$ originate from the circuitry of FIGS. 5, 6, or 7, respectively.

If circuit delay permits, the single-bit registers (flipflops) 55/57/75, 93/95/99, and 107, 109, 113, which in FIGS. 5, 6, and 7 buffer the output values, can be omitted, thus reducing processing delay by one signaling period. Similar simplifications are also posible in connection with deriving tentative decisions from portion 149 and the final decision, if circuit delay is not critical in the further operations performed with these signals.

Embodiments for Dicode and Duobinary Channels

The partial-response class-IV embodiments described above can be converted to dicode embodiments by removing the registers and flipflops used for interleaving and pipelining. Removing a register or flipflop means deleting it from the circuit and connecting its inputs directly to their corresponding outputs. The elements to be removed are 43, 45, 47, and 49 in FIG. 5 with elements 83, 89 in FIG. 6, 101 in FIG. 7, and 151, 153, 155, 157, 159, 161, 163, and 165 in FIG. 9. The dicode embodiments can be converted to duobinary embodiments by the following modifications. The "V unit" 25 in FIG. 5 should generate an output according to the duobinary versions of equations (14) and (15):

$$V_k(a_k', a_{k-1}') = \begin{cases} y_k(a_k' + a_{k-1}') - a_k'a_{k-1}' & \text{WMF,} \quad (14b) \\ z_k a_k' - a_k'a_{k-1}' & \text{MF.} \quad (15b) \end{cases}$$

Subtractor 85 in FIG. 6 should be changed to an adder, and adder 91 should be changed to a subtractor. The designations of 61a and 59a should be interchanged. Further, the adder in FIG. 7 should be changed to a subtractor. The designation 61b and 59b should also be interchanged.

| TABLE OF SYMBOLS USED | | |
|---|---|---|
| a = discrete amplitude<br>b = binary<br>c = continuous<br>s = sampled | | |
| | Value Range | Time Relation |
| $a_n$ transmitted value | a | s |
| $x(t)$ received signal | c | c |
| $y(t)$ filtered receiver signal (WMF) | c | c |
| $z(t)$ filtered receiver signal (MF) | c | c |
| $y_n$ receiver sample value | c | s |
| $z_n$ receiver sample value | c | s |
| $a'_n$ assumed receiver value | a | s |
| $\hat{a}_n$ final decided receiver output value | a | s |
| $b_n \pm$ intermediate output value (for $a_n = +1$ or $a_n = -1$) | b | s |
| $\hat{b}_n$ final decided receiver output value | b | s |
| $J_n$ survivor metric, cost factor | c | s |
| $DJ_n$ difference of two survivor metrics | c | s |
| $P_k$ auxiliary quantity | c | s |
| $Q_k$ auxiliary quantity | c | s |
| $V_k$ auxiliary quantity | c | s |
| $h(t)$ transmission characteristic (channel or filter) | | |
| $s(t)$ transmission characteristic (filter) | | |
| T signaling/sampling period | | |
| L defines the number $2^L$ of sublevels between receive signal levels | | |

We claim:

1. An apparatus for maximum-likelihood sequence decoding of sample sequences with intersymbol interference of the partial-response class-IV type, said apparatus forming a decoder processing path responsive to received signals $x_t$, said path typically including ad seriatim a whitened-matched filter (13), sampling means (15), metric value determining circuitry (19), and storage updating means (21) for survivor sequences, characterized in that:

the metric value determining circuitry (FIG. 6) comprises:
a subtractor (85) having as a first input thereto a sample value $y_n$;
a unit (81) for limiting the output of the subtractor to a range between +1 and −1;
means (91) for combining the output of the limiting unit and the sample value and for providing binary sign magnitude indication of said combined output $\hat{b}_{n-1}$; and
a path (87) applying the combining means output $DJ_{n-1}$ as a second input $DJ_{n-2}$ to the subtractor;
said metric determining circuitry being further characterized in that:
said combining means output $DJ_{n-1}$ representing a recursive difference survivor metric formed from the range limited difference between the sample value $y_{n-1}$; and
said subtractor output representing the difference between combining means output $DJ_{n-1}$ and the sample value $y_n$.

2. A method of maximum-likelihood sequence decoding of the output signal of a communication or recording device channel, said channel synchronously transmitting or recording a sequence of binary symbols $a_n = +1$ or $-1$, n being an integer symbol time index, said output signal being filtered and sampled to obtain samples $y_n$ with intersymbol interference of the partial-response classes described by the polynomials $1+d$, $1-d$, or $1-d^{22}$, the method determining from the samples $y_n$ the most likely transmitted or recorded sequence of binary symbols, said method being executable on a decoder of the type having a memory for storing binary valued indicia of state transitions underlying said decoding method, comprising the steps of:

recursively computing a difference metric at each sampling instant, which metric represents the difference between implicit survivor metrics, each implicit survivor metric indicating the probability of occurrence of the binary survivor sequence obtained and stored in the decoder memory, the recursive computing step further including the steps of:
generating two binary symbol decisions and using said decision to extend the binary survivor sequences stored in the path memory, the sign of the difference metric determining at each sampling instant which one of the survivor sequences currently stored in the path memory is the more probable sequence from which the output of the decoder is to be selected.

3. A method according to claim 2, wherein the maximum-likelihood sequence decoding of sample signals with intersymbol interference of the partial-response class-IV type being described by polynomial $1-d^2$, and further wherein the sequences of even and odd indexed samples $y_n$ are independently decoded based upon independent state transition diagrams with two states at each sampling instant.

* * * * *